3,741,841
PRODUCTION OF SYNTHETIC PAPERS
Takashi Toyoda, Yoshio Miyabe, and Yozo Ooba, Yokkaichi, Japan, assignors to Kabushiki Kaisha Oji Yuka Goseishi Kenkyujo, Tokyo-to, Japan
No Drawing. Filed June 23, 1971, Ser. No. 156,042
Claims priority, application Japan, July 6, 1970, 45/58,902; Aug. 21, 1970, 45/73,214, 45/73,215
Int. Cl. B29c 17/02
U.S. Cl. 156—229        5 Claims

ABSTRACT OF THE DISCLOSURE

A polypropylene resin containing from 0.2 to 30 percent by volume of a fine filler for a paper-like layer is laminated onto at least one surface of a base layer film stretched in a longitudinal direction and formed from a mixture of polypropylene resin and an additive of a type and quantity such as to lower the lower limit of the temperature range wherein the resin is practically stretchable, and the composite structure thus obtained is heat stretched in a transverse direction and then cooled as it is held in its stretched state. The additive can be a plasticizer polymer or a fine filler.

REFERENCE TO RELATED APPLICATIONS

Reference is made to the following copending applications: Takashi et al., United States patent application Ser. No. 809,629, filed Mar. 24, 1969, now abandoned, entitled: "Synthetic Papers and Method of Making the Same."

BACKGROUND OF THE INVENTION

This invention relates generally to so-called synthetic papers and more particularly to new and advanced process for producing synthetic papers possessing whiteness and opacity and exhibiting very little heat shrinkage.

According to a previous invention we have made, there is provided a synthetic paper of laminated structure comprising a first film of a thermoplastic resin admixed with from 0 to 20 percent by weight of a fine inorganic filler and a second film of a thermoplastic resin admixed with from 0.5 to 65 percent by weight of a fine inorganic filler and adhering to at least one surface of the first film, the first film being in a biaxially drawn or oriented state, and the second film being in a uniaxially oriented state.

This type of synthetic paper is described in the specification of United States patent application Ser. No. 809,629, filed Mar. 24, 1969, now abandoned, entitled: "Synthetic Papers and Method of Making the Same."

A process we have previously invented for producing a synthetic paper of this character comprises laminating a paper-like layer of a thermoplastic resin admixed with from 0.5 to 65 percent by weight of a fine inorganic filler on at least one surface of a base film made of a thermoplastic resin admixed with from 0 to 20 percent by weight of a fine inorganic filler and drawn or stretched at least 1.3 times in one direction, called the longitudinal direction, thereof, heating and drawing the composite structure thus obtained at least 2.5 times in the transverse direction, perpendicular to the longitudinal direction, and cooling this structure as it is preserved substantially in the drawn or stretched state.

In a synthetic paper of this character, the uniaxially-drawn paper-like layer admixed with the fine filler contains a large number of microvoids produced by the drawing of the composite structure and, therefore, the uniaxially-drawn layer, in a state wherein it is admixed with the filler. These microvoids impart an excellent opacity or whiteness to this synthetic paper. Furthermore, the base film thus biaxially stretched supports the relatively thin paper-like layer and, at the same time, imparts mechanical strength necessary for the synthetic paper as a paper.

In the production of a synthetic paper of this character in which the degree of whitening of the paper-like layer is due principally to the microvoids in the paper-like layer, drawing conditions advantageous for the formation of these microvoids should be selected. Accordingly, the stretch or stretch multiple of the paper-like layer should be made high, and, at the same time, it is desirable that the drawing be carried out at the lowest temperature possible in view of the optimum drawing temperature of the resin.

On one hand, in a synthetic paper comprising stretched films, in general, accumulation of stretching stresses becomes a problem. More specifically, as the synthetic paper is cooled while its stretched state is substantially sustained, the stretching stresses applied at the time of stretching in many cases accumulate without being sufficiently relieved. When this stress accumulation becomes excessive, it gives rise to poor dimensional stability of the resulting synthetic paper and causes abnormal deformations such as wrinkles, waves, and curls which give rise to great difficulties in printing.

Furthermore, in a synthetic paper comprising stretched films, in general, the directivity relating to certain properties becomes a problem. More specifically, in a conventional paper comprising cellulose fibers in intertwined state, properties such as tensile strength, tearing strength, and stiffness ordinarily have directivities with respect to the paper roll longitudinal and transverse directions, and the existence of such directivities is desirable in some cases depending on the use. On the other hand, there are cases where directivities are undesirable. Particularly in the case of synthetic papers, since the existence of directivities are not actually unavoidable as in the case of ordinary cellulose paper, it can be said that the possibility of readily producing isotropic synthetic papers is a desirable feature.

SUMMARY OF THE INVENTION

It is an object of this invention to provide one solution to the above described problems by using a specific resin mixture for the resin of the base layer for the purpose of lowering the optimum drawing temperature of the base layer.

According to this invention, briefly summarized, there is provided a process for producing a synthetic paper comprising a base layer and a paper-like layer in laminated combination, which process comprises: (1) preparing a film to constitute the base layer by forming a sheet having a longitudinal direction of a thermoplastic resin composed essentially of a mixture of a polypropylene resin (A) and an additive (B) of a type and quantity sufficient to lower the lower limit of the temperature range wherein stretching of the polypropylene resin is practically possible and stretching this sheet uniaxially in the longitudinal direction; (2) laminating onto at least one surface of the film thus prepared a second polypropylene resin containing from 0.2 to 30 percent by volume of a fine filler blended therewith thereby to form a composite structure, wherein the second polypropylene resin is to constitute the paper-like layer; (3) heat stretching the composite structure in a transverse direction perpendicular to the longitudinal direction; and (4) cooling the structure thus stretched as it is maintained substantially in its stretched state.

The nature, principle, and utility of this invention will be more clearly apparent from the following detailed description beginning with a consideration of general aspects and features of the invention and concluding with specific examples of practice illustrating preferred embodiments of the invention.

DETAILED DESCRIPTION

In the practice of this invention, as mentioned briefly hereinbefore, a polypropylene resin which is advantageous for reasons such as high surface hardness of the resulting paper-like layer and facility with which it can be whitened or with which fine microvoids can be formed therein is used as a resin for the paper-like layer, and a blended mixture of a polypropylene which has a lower optimum drawing temperature than the paper-like layer resin and, moreover, is advantageous for reasons such as a rigidity ample for the base layer and the aforementioned additive B is used as a resin for the base layer.

This "additive B" can be broadly classified into (1) plasticizer polymers exhibiting plasticizing effect with respect to polypropylene resins and (2) fine fillers.

A synthetic paper of this character satisfactorily achieves the objects of this invention.

More specifically, in the case where the paper-like layer is a polypropylene blended with a fine inorganic filler, the temperature for practical whitening due to the formation of microvoids is of the order of from 140 to 160° C. On the other hand, in the case where the base layer is a polypropylene resin without admixture, the temperature at which practical drawing is possible is of the order of from 150 to 170° C. For this reason, the temperature range wherein microvoids can be effectively formed and, at the same time, a stretched laminated structure, i.e., the synthetic paper, can be stably formed is relatively narrow.

However, in the case where the base layer is a blend of a polypropylene resin and a plasticizer ploymer, the temperature range wherein stretching of the base layer is practically possible becomes broad or shifts toward the lower temperature side, and the temperature range in which it is possible to produce a synthetic paper wherein microvoids are effectively formed increases by a value of the order of from 10 to 15° C., in some cases of the order of from 10 to 30° C.

A lowering of the lower limit by from 10 to 15 or 30° C. is highly important in that it is highly effective in causing the paper-like layer to undergo uniform whitening to a high degree, and in that it affords stable, continuous operation without difficulties such as tearing of the paper sheet due to unsuitable drawing temperature.

The term "temperature range wherein stretching is practically possible" is herein used to designate that temperature range which is lower than the temperature at which the resin constituting the predominant constituent of a film bocomes fluid and is higher than temperatures at which the resin can deform under external stress, and in which the film can be uniformly drawn or stretched without rupturing when it is stretched at a stretching speed which is amply high for actual utilization on an industrial basis.

The stretchable temperature range varies with factors such as the stretching speed, the resin additives such as plasticizers, and the blend of different resins. In general, however, provided that the other conditions are the same, the stretching stress increases and the stretchable temperature range becomes narrow with increasing stretching speed.

Furthermore, as mentioned hereinbefore, the dimensional stability or heat shrinkage of the product becomes a problem in the case of a synthetic paper comprising a stretched film. However, the stretch stress accumulated in the base layer, which greatly influences the dimensional stability of a synthetic paper of laminated construction, appears to be considerably lowered in the case where the aforementioned additive B is a plasticizer polymer.

Accordingly, a synthetic paper according to this invention has high dimensional stability in spite of the low temperature of a subsequent stretching process, this condition being related to the generation and accumulation of stretching stress, and, furthermore, the heat shrinkage is small. The heat shrinkage in this case is that within a temperature range of the order of from room temperature to 100° C., which is amply lower than the melting point of the resin used. Moreover, since the stretching is carried out uniformly, the occurrence of stretching deviations and irregularities is prevented.

Another advantageous feature of this invention is that in the production of a synthetic resin according thereto, it is possible to establish the elongations or stretches in the longitudinal and transverse directions in a mutual independent manner and, moreover, at amply large magnitudes.

In general, when transverse drawing is carried out after longitudinal drawing of a biaxially stretched film, the longitudinal orientation is nulified to some extent. For this reason, it is ordinarily necessary to make the longitudinal stretch slightly greater in order to obtain a biaxially stretched film of matched stretches in the longitudinal and transverse directions by the successive biaxial drawing method. Accordingly, in the case also of a synthetic paper of laminated construction as described hereinbefore, it is necessary in some cases, depending on the type of resin used, to cause the ratio of longitudinal and transverse stretches to be greater than one (unity) in order to eliminate directivity.

However, when the longitudinal stretch becomes excessively large, the transverse stretch-formability is remarkably lowered. Accordingly, a limit is imposed on the magnitude of the longitudinal stretch. Consequently, the transverse stretch is likewise restricted. For example, when the longitudinal stretch is 7 times, the transverse stretch is ordinarily held within a value of the order of 5 times.

In accordance with this invention, however, particularly in the case where the aforementioned plasticizer polymer is a polyethylene resin, it is possible to produce a substantially isotropic synthetic paper with equal stretches, e.g., 7×7 times, in the longitudinal and transverse directions by increasing the transverse stretch. A large transverse stretch, that is, the stretch imparted to the paper-like layer, means an increase in the whitening and an improvement in the strength of the paper-like layer.

A further feature of this invention is that, particularly in the case where an additive B is the fine filler, microvoids are formed also in the base layer in correspondence with the stretching thereof in a state wherein the fine filler is bended therewith. As a result, the foldability and Clark stiffness of the synthetic paper produced is improved.

The term "foldability" herein designates the character of a sheet whereby, when it is folded, it retains its folded state. The foldability of known synthetic papers, in general, have been unsatisfactory, it being difficult to preserve folded states in these synthetic papers. In contrast synthetic papers according to this invention have substantially improved foldability. The reason for this may be that the strain at a fold is relieved because of the presence of microvoids not only in the paper-like layer but also in the base layer.

Base-layer resin

The resin for the base layer used in this invention to afford the above described advantageous features is a blend of a polypropylene resin and an additive B.

Polypropylene resin

For this polypropylene resin, homopolymers of propylene and copolymers of propylene each containing a comonomer of a small quantity such that these copolymers may be called polypropylene resins can be used. Examples of these propylene copolymers which can be used are copolymers of propylene with α-olefins such as ethylene and butene-1 and vinyl monomers such as vinyl chloride, styrene, and esters of acrylic acid. The comonomer content in each of these copolymers is of the order of 10 percent by weight or less.

Additive B

As mentioned hereinbefore, the additive B can be broadly divided into plasticizer polymers and fine fillers.

(1) Plasticizer polymer:

A representative example of a preferred plasticizer polymer is a high-density polyethylene. Preferred high-density polyethylenes are those which have been prepared by the so-called medium-pressure process, the low-pressure process, or some other suitable process and have a density of at least 0.95 gram/cc. This "polyethylene" also may be a copolymer with a comonomer of a small quantity such that the copolymer may be called a polyethylene resin. Provided that the objects of this invention are achieved, both resins may be of any molecular weight or melt index (M.I.) and isotactic index (I.I.).

The blending ratio of the two resins, (polypropylene resin)/(polyethylene resin), by weight is from 90/10 to 40/60, preferably from 90/10 to 70/30. We have found that when the polyethylene content is less than 10 percent by weight, sufficient blending effect is not apparent, and that, on the other hand, a polyethylene content exceeding 60 percent by weight causes the forming temperature to be too low, whereby the range of practical whitening temperature becomes narrow.

Other than high-density polyethylenes as described above, various thermoplastic resins and elastomers which are mutually soluble with the above mentioned polypropylene resin and have plasticizing effect with respect to the polypropylene resin can be used for the plasticizer polymer. Since these substances are used for the purpose of spreading the practical stretching temperature range toward the lower temperature side, the melting or softening points thereof should, in general, be lower than that of the polypropylene resin.

Examples of such plasticizer polymers are low-density polyethylenes of densities of the order of from 0.90 to 0.94 g./cc.; ethylene copolymers, e.g., ethylenepropylene copolymers each of an ethylene content of the order of less than 5 percent by weight; ethylene vinyl ester copolymers, e.g.; copolymers each of a vinyl acetate content of the order of less than 40 percent by weight; ethylenevinyl chloride coplymers; styrenes by themselves and copolymers thereof, the terem "styrenes" including side-chain and/or nucleus-substituted styrenes such as α-methylstyrene and vinyltoluenes, the copolymers being copolymers of these styrenes with substances such as acrylonitrile and esters of methacrylic acid; vinyl halides homo- and copolymers, e.g., polyvinyl chloride and poly(vinyl chloride-vinylidene chloride); and atactic polypropylenes, such as those produced as by-products in the production of the aforementioned polypropylene resins, preferably those exhibiting a solubility in boiling n-heptane of the order of more than 50 percent by weight.

The optimum blending proportions of these plasticizer polymers differ with the type of polymer. For example, we have found that in the case of atactic polypropylenes, a quantity of the blending additive of less than 5 percent by weight does not produce any blending effect. On the other hand, when this quantity exceeds 20 percent, the formability of the resin becomes poor, and, at the same time, the strength (i.e., stiffness and tensile strength) of the product becomes poor.

We have found further that in the case of ethylene-propylene copolymer resins, the desirable range of this blending quantity is of the order of from 10 to 50 percent. In the case of low-density polyethylenes, this range is of the order of from 10 to 30 percent, while in the case of ethylene-vinyl acetate copolymers, this range is of the order of from 10 to 30 percent.

(2) Fine filler:

When a fine filler is to be used as the additive B, it is necessary to satisfy certain conditions relating to variables such as the particle size of this filler, blending quantity thereof, and the stretch in the process for producing synthetic papers according to this invention. When these conditions are satisfied the objects of this invention can be achieved.

While organic fillers such as powdered resins which are not mutually soluble with the above described polypropylene resins may be used as fine fillers, inorganic fillers are ordinarily used. Examples of suitable inorganic fillers are clays, talc, asbestos, gypsum, barium sulfate, calcium carbonate, magnesium carbonate, titanium oxide, zinc oxide, magnesium oxide, diatomaceous earth, silicon oxide, and mixtures thereof.

One requirement is that these fillers have an average particle size of from 0.5 to 5 microns. Another requirement is that the content of any of these fine fillers in the base-layer resin be from 0.2 to 8 percent by volume, preferably from 0.8 to 6 percent by volume. The unit herein referred to as "percent by volume" is defined as that obtained by calculating the volumes of the filler and the resin respectively from the weights thereof used and their true specific gravities on the basis of (filler volume) + (resin volume).

Irrespective of whether the additive B is a plasticizer polymer or a fine filler, it may contain when necessary a small quantity of other auxiliary ingredients such as, for example, a stabilizer, a plasticizer, a pigment, a filler, and resins. For example, in the case where the additive B is a plasticizer polymer, it is possible to add a filler of the aforedescribed character in a quantity of the order of up to 20 percent by weight. By this procedure, a contribution by the base layer with respect to the degree of whitening of the synthetic paper produced or an improvement in the adhesiveness of the base layer relative to the paper-like layer can be expected.

Paper-like-layer resin

On one hand, the resin for the paper-like layer is a polypropylene resin which can be the same as or different from the polypropylene resin for the base layer. This resin for the paper-like layer is one which contains a fine filler. While, this fine filler may be an organic filler such as a powdered resin which is not mutually soluble with the above mentioned polypropylene resin, an inorganic filler is ordinarily used.

Examples of suitable inorganic fillers are clays, talc, asbestos, glysum, barium sulfate, calcium carbonate, magnesium carbonate, titanium oxide, zinc oxide, magnesium oxide, diatomaceous earth, silicon oxide, and mixtures thereof. It is necessary that these fillers be used in an amply fine state, i.e., with a particle size of the order of from 0.5 to 30 microns. We have found that a suitable content of a fine filler of this character in the paper-like layer is from 0.2 to 30 percent by volume, preferably from 2 to 25 percent by volume.

Depending on the necessity, this fine inorganic filler can be used together with other additives such as pigments and animal, vegetable, and mineral fibers. Furthermore the resin for the paper-like layer may contain a small quantity of other resin ingredients.

In the case where the additive B is a fine filler, it is necessary that the filler content (Fb) in the base layer be less than the filler content (Fp) in the paper-like layer.

Lamination

In accordance with this invention, a longitudinally drawn film of the above described mixture of a polypropylene resin and a plasticizer polymer is first prepared by any suitable known process. The stretch or elongation in this process is of the order of from 1.3 to 10 times, particularly of the order of from 2.5 to 7 times.

To at least one surface of the film thus longitudinally drawn, the resin for the paper-like layer is laminated by the calendering process involving melting of the resin, the melt-extrusion laminating process, or some other suitable process. It is also possible to deposit on the base film an anchor coat which can be used in the above mentioned melt-extrusion laminating process. While the paper-like layer contains a fine filler, it is also possible to cause the filler concentration to be low or to be zero in the regions of the paper-like layer to be laminated to the parts near the two lateral edges of the longitudinally drawn film.

The composite structure thus obtained, that is, the laminated structure of the longitudinally drawn film and a substantially unstretched film, is next drawn under heating in the transverse direction. By this drawing step, the paper-like layer is whitened, and it is possible, moreover, to secure a strong bond between the base layer and the paper-like layer and, at the same time, to make both layers extremely thin. This drawing is carried out to produce a stretch of the order of from 2.5 to 12 times, particularly from 3.5 to 10 times. The drawing temperature is higher than the softening points and lower than the melting points of the resins used, preferably from 110 to 165° C.

In the case where the additive B is a fine filler, it is necessary to carry out the above described drawing in two directions in a maner such that the product of the stretch, i.e. number of times, due to the longitudinal drawing of the base film and the stretch or number of times due to the transverse drawing of the laminated composite structure is at least 3.5.

After the composite structure has been transversely drawn, it is cooled as its stretched state is substantially preserved, and then the lateral edges are trimmed off, whereupon a synthetic paper of this invention is obtained.

In the case where the concentration of the filler in the lateral edges, that is, in the part of the paper-like layer in the vicinity of the two lateral edge regions of the base layer, is low or zero, and the trimmed-off edges are recovered and reused in the strating-material resin, the control of the filler content in this starting-material resin is advantageously convenient.

A synthetic paper produced in the above described manner can be subjected, when necessary, to a suitable surface treatment such as, for example, a corona discharge treatment or an oxidation treatment thereby to modify and improve the surface characteristics.

In order to indicate still more fully the nature and utility of this invention, the following specific examples of practice constituting preferred embodiments of the invention and results set forth, it being understood that these examples are presented as illustrative only and that they are not intended to limit the scope of the invention.

EXAMPLE 1

20 parts of a high-density polyethylene of a M.I. of 1.00 in powdered form was mixed in a super mixer with 80 parts of a polypropylene of a M.I. of 0.8, and the resulting mixture was granulated in a granulating machine. The pellets thus obtained were heated and kneaded in an extruding machine operated at 270° C. and then extruded through the extruder die. The sheet material thus formed was cooled by a cooling device to a temperature below 40° C., whereupon an unstretched film was obtained. This film was drawn by means of a longitudinally drawing machine to impart thereto a stretch of 6 times.

40 parts of a clay was mixed with 60 parts of a polypropylene of a M.I. of 4.0 to form a composition, which was extrusion laminated to one surface of the above described film drawn uniaxially in the longitudinal direction. The resulting laminated structure was stretched 7 times in the transverse direction at 145° C. and then cooled in the as-stretched state. The lateral edge parts of the sheet material were then trimmed off, and the resulting synthetic paper was taken up in roll.

This synthetic film was found to be a laminated structure composed of a base layer of 50 microns thick and a paper-like layer of 40 microns thick. The adhesive strength between the two layers was strong, and the two layers could not be peeled apart by pulling apart pieces of a pressure-sensitive adhesive cellophane tape stuck thereto. It was found that this laminated structure could be used for exactly the same purposes as ordinary papers because of its excellent properties such as strength, handling, printability, and writability. The principal quantitative features of this synthetic paper were as follows.

Thickness: 90 microns
Clark stiffness (S value): Longitudinal/transverse=25/30.
Long./trans. ratio of Young's moduli: 1/1.3.
Stiffness strength ratio: 1/1.2.
Whiteness: 89% (Hunter)
Specific gravity: 0.75

EXAMPLE 2

The same process was carried out with varied proportions of the high-density polyethylene. The results were as indicated in Table 1.

TABLE 1

| Experiment No. | Blends, wt. percent | | Transverse drawing conditions | | Whitening possible, temp. range | Whitened state | Clark stiffness balance, TD/MD | Hunter whiteness, percent |
|---|---|---|---|---|---|---|---|---|
| | Base layer, PP/PE | Paper-like laber | Temp., °C. | Stretch, times | | | | |
| 1 | 100 | PP 60%, filler 40% | 155 | 7 | Narrow | Local whitening irregularities | 2.5 | 87 |
| 2 | 90/10 | do | 150 | 7 | Broad | Good | 2.0 | 88 |
| 3 | 80/20 | do | 150 | 7 | do | do | 1.7 | 89 |
| 4 | 70/30 | do | 145 | 7 | do | do | 1.5 | 90 |
| 5 | 50/50 | do | 145 | 7 | do | do | 1.3 | 90 |
| 6 | 40/60 | do | 140 | 7 | do | do | 1.1 | 90 |
| 7 | 30/70 | do | | | Narrow | | | |

Symbols.—PP=polypropylene; PE=high-density polyethylene; TD=transverse direction; MD=longitudinal direction.

EXAMPLE 3

Seven resin samples were prepared by blending in concentrations of 0, 10, 30, 40, 50, 60, and 80 percent by weight of an ethylenepropylene copolymer (ethylene content 3 percent by weight) with a polypropylene of a M.I. of 0.8. Each resin sample was thus heated and kneaded in an extruding machine operated at 270° C. and was extruded through the extruder die. The resulting sheet material was cooled with water maintained at a temperature below 40° C., whereupon an unstretched film was stretched 6 times by means of a longitudinal drawing machine.

Next, a composition prepared by mixing 60 parts of a polypropylene of a M.I. of 4.0 and 40 parts of a clay was extrusion laminated to one surface of this film uniaxially stretched in the longitudinal direction. The resulting laminated structure was stretched 7 times in the transverse direction.

Each of the resulting sheets was found to be as laminated structure composed of a base layer of a thickness of 50 microns and a surface layer (paper-like layer) of 40 microns. The adhesion between the two layers was strong, and the two layers could not be peeled apart when pieces of cellotape stuck thereto were pulled apart.

These synthetic papers were found to have the properties indicated in Table 2 and to be usable for exactly the same purposes as conventional papers, having equivalent characteristics such as strength, handling, printability, and writability.

TABLE 2

| Experiment number | Base layer blend, A/B[1] | Transverse drawing conditions | | Whitening possible range | Whitened state | Clark stiffness balance, TD/MD[2] | Hunter whiteness, percent | Hunter opacity, percent | Heat shrinkage, longitudinal/ transverse, percent |
|---|---|---|---|---|---|---|---|---|---|
| | | Temp., °C. | Stretch, times | | | | | | |
| 8 | 100/0 | 155 | 7 | Narrow | Local whitening irregularities | 2.5 | 87 | 90 | 4.4/2.6 |
| 9 | 90/10 | 153 | 7 | Slightly broad | Good | 2.5 | 89 | 92 | 4.2/2.5 |
| 10 | 70/30 | 150 | 7 | Broad | do | 2.4 | 88 | 92 | 4.2/2.3 |
| 11 | 60/40 | 150 | 7 | do | do | 2.5 | 89 | 92 | 4.0/2.1 |
| 12 | 50/50 | 150 | 7 | do | do | 2.3 | 88 | 93 | 4.0/2.1 |
| 13 | 40/60 | 150 | 7 | do | Local whitening irregularities | 2.6 | 88 | 94 | 3.6/2.1 |
| 14 | 20/80 | 145 | 7 | do | do | 2.4 | 89 | 94 | 3.4/2.1 |

[1] A=Polypropylene; B=Ethylene-Propylene copolymer; MD=Longitudinal direction.
[2] TD=Transverse direction.

EXAMPLE 4

Five resin samples were prepared by blending in concentrations of 0, 5, 10, 20, and 30 percent by weight of an atactic polypropylene obtained as a by-product in the production of polypropylene with a polypropylene of a M.I. of 0.8. Each resin sample was then heated and kneaded in an extruding machine operated at 270° C. and was extruded through the extruder die into a sheet, which was cooled with cooling water maintained at a temperature below 40° C., whereupon an unstretched film was obtained. This film was stretched 6 times by means of a longitudinal drawing machine.

Next, a composition prepared by mixing 40 parts of a clay with 60 parts of a polypropylene of a M.I. of 4.0 was extrusion laminated to one surface of the film uniaxially drawn in the longitudinal direction. The resulting laminated structure was drawn in the transverse direction to impart thereto a stretch of 7 times.

Each of the products thus obtained was found to be a laminated structure composed of a base layer of 50-micron thickness and a surface layer (paper-like layer) of 40-micron thickness. The adhesion between these two layers was strong, and these layers could not be peeled apart when pieces of cellotape stuck thereto were forced apart.

The synthetic papers thus produced were found to possess the properties indicated in Table 3 and to be usable for exactly the same purposes as conventional papers, having equivalent strength, handling, printability, and writability.

parison based on the same quantity of 75 grams/square meter (g./m.[2]).

TABLE 4

| Base layer filler content, (vol. percent) | Foldability, recovery angle, degrees | Stiffness, Clark |
|---|---|---|
| 0 | 126 | 23 |
| 0.8 | 95 | 25 |
| 2.0 | 52 | 28 |
| 4.0 | 51 | 32 |
| 6.0 | 44 | 37 |

EXAMPLE 6

To six lots of a polypropylene (PP) of a M.I. of 0.8 were added respectively different quantities of a clay of an average particle diameter of 1 micron and a true density of 2.7 g./cc. Each of the resulting mixtures was further mixed in powder state in a super mixer and then granulated into pellets in a granulator. These pellets were heat kneaded in an extruding machine operated at 270° C. and extruded through the extruder die into a sheet, which was cooled by means of a cooling device, whereupon an unstretched sheet was obtained.

This sheet was drawn in a longitudinal drawing machine to impart a stretch of 6 times thereto. A composition prepared by mixing 84 percent by volume of a polypropylene of a M.I. of 4.0 and 16 percent by volume of a clay of an average particle diameter of 1 micron was then laminated to one surface of this film drawn uni-axially in the longitudinal direction. The resulting laminated struc-

TABLE 3

| Experiment number | Base layer blend, A/C[1] | Transverse drawing conditions | | Whitening possible range | Whitened state | Clark stiffness balance, TD/MD[2] | Hunter whiteness, percent | Hunter opacity, percent | Heat shrinkage, longitudinal/ transverse, percent |
|---|---|---|---|---|---|---|---|---|---|
| | | Temp., °C. | Stretch, times | | | | | | |
| 15 | 100/0 | 155 | 7 | Narrow | Local whitening irregularities | 2.5 | 87 | 90 | 4.4/2.6 |
| 16 | 95/5 | 150 | 7 | Broad | Good | 2.3 | 89 | 93 | 4.0/2.5 |
| 17 | 90/10 | 150 | 7 | do | do | 2.3 | 89 | 93 | 3.8/2.2 |
| 18 | 80/20 | 145 | 7 | do | do | 2.2 | 89 | 95 | 3.1/2.2 |
| 19 | 70/30 | | | Poor stretch abilty | | | | | |

[1] A=Polypropylene; C=Atactic polypropylene.
[2] TD=Transverse direction; MD=Longitudinal direction.

EXAMPLE 5

A polypropylene to which a filter comprising calcium carbonate and a clay had been added was used for the paper-like layer, the filter content being 18 percent by volume, while a polypropylene in five lots respectively containing different qauntities of the same filler was used for the base layer to prepare five synthetic paper samples.

The foldabilities as expressed in terms of recovery angle and stiffnesses in terms of Clark stiffness of the synthetic paper samples thus prepared were measured for comparison, whereupon the results shown in Table 4 were obtained. The values of Clark stiffness are values resulting from comture was drawn in the transverse direction to impart thereto a transverse stretch of 7 times.

In the case of the six samples thus produced, longitudinal drawing was found to be possible within a temperature range of from 85 to 140° C., while transverse drawing was found to be possible within a range of from 130 to 165° C. Each of these films was thermoset in its as-stretched state and then cooled. Finally, the lateral edges of each film were trimmed off, and the resulting film was wound.

Each of these films was found to be usable for exactly the same purposes as conventional papers, having equivalent strength, handling, printability, writability, and other characteristics. The particulars and results relating to the six synthetic paper samples thus produced are shown in Table 5.

TABLE 5

| Base layer blend, vol. ratio | Transverse drawing Stretch, times | Transverse drawing Temp., °C. | Transverse drawings possible temp. range, °C. | Clark stiffness | Whiteness, percent | Opacity, percent | Foldability, recovery angle, degrees | Heat shrinkable, longitudinal/ transverse, percent | |
|---|---|---|---|---|---|---|---|---|---|
| PP/filler: | | | | | | | | | |
| 100/0 | 7 | 155 | 165–145 | 23 | 87 | 90 | 126 | 4.4/2.6 | |
| 99.2/0.8 | 7 | 150 | 165–135 | 25 | 88 | 92 | 95 | 3.5/3.0 | |
| 99/1 | 7 | 150 | 165–130 | 28 | 89 | 93 | 52 | 2.5/3.0 | |
| 94/6 | 7 | 150 | 165–130 | 32 | 89 | 93 | 51 | 2.4/2.8 | |
| 92/8 | 7 | 150 | 165–130 | 37 | 91 | 95 | 44 | 2.5/2.8 | |
| 90/10 | 7 | 150 | 165–135 | 37 | 91 | 96 | 42 | 2.5/2.5 | Poor formability. Low adhesive strength of paper-like layer. |

What is claimed is:

1. A process for producing a synthetic paper made up of a base layer and a paper-like layer in laminated combination, which process comprises: preparing a film to constitute said base layer of a thermoplastic resin uniaxially stretched in a longitudinal direction, said resin being essentially a mixture of a polypropylene resin and an additive of a type and quantity such as to lower the lower limit of the temperature range wherein stretching of said polypropylene resin is practically possible; laminating onto at least one surface of said film a second polypropylene resin containing from 0.2 to 30 percent by volume of a fine filler blended therewith thereby to form a composite structure, wherein said second polypropylene resin is to constitute said paper-like layer; heat stretching said composite structure in a transverse direction perpendicular to said longitudinal direction; and cooling the structure while it is maintained substantially in its stretched state.

2. A process for producing a synthetic paper, which comprises: preparing a film to constitute a base layer by forming a sheet having a longitudinal direction of a thermoplastic resin composed essentially of a mixture of fiirst polypropylene resin and a plasticizer polymer of a type and quantity sufficient to lower the lower limit of the temperature range wherein stretching of the polypropylene resin is practically possible and stretching said sheet uniaxially in said longitudinal direction; laminating onto at least one surface of the film thus prepared a second polypropylene resin containing from 0.2 to 30 percent by volume of a fine filler blended therewith thereby to form a composite structure, wherein said second polypropylene resin is to constitute a paper-like layer; heat stretching said composite structure in a transverse direction perpendicular to the longitudinal direction; and cooling the structure thus stretched while it is maintained substantially in its stretched state.

3. A process for producing a synthetic paper made up of a base layer and a paper-like layer in laminated combination, which process comprises: laminating a second polypropylene resin blended with a fine filler to constitute said paper-like layer onto at least one surface of a film to constitute said base layer of a first polypropylene resin blended with a fine filler, said film being uniaxially stretched in a longitudinal direction, thereby to form a composite structure; stretching said composite structure in a transverse direction perpendicular to said longitudinal direction; and cooling the structure thus stretched as it is maintained substantially in its stretched state, the following conditions being simultaneously fulfilled during the process:

(1) the content Fb of the filler in said first polypropylene resin is from 0.2 to 8 percent by volume;

(2) the content Fp of the filler in said second polypropylene resin is from 0.2 to 30 percent by volume;

(3) Fb is less than Fp;

(4) the product of the stretches in the longitudinal and transverse directions, each expressed as final stretched length divided by the original length, is equal to or greater than 3.5; and (5) the average particle diameter of the fillers is from 0.5 to 5 microns.

4. A process for producing a synthetic paper which comprises:

preparing a film to constitute a base layer by forming a sheet having a longitudinal direction of a thermoplastic resin composed essentially of a mixture of a first polypropylene resin and a polyethylene resin having a density greater than 0.95 g./cc. in a weight ratio of said first polypropylene resin to said polyethylene resin of from 40/60 to 90/10, the polyethylene resin lowering the lower limit of the temperature range wherein stretching of the polypropylene resin is practically possible and stretching said sheet uniaxially in said longitudinal direction;

laminating onto at least one surface of the film thus prepared a second polypropylene resin containing from 0.2 to 30 percent by volume of a fine filler blended therewith thereby to form a composite structure, wherein said second polypropylene resin is to constitute a paper-like layer;

heat stretching said composite structure in a transverse direction perpendicular to said longitudinal direction; and cooling the structure while it is maintained substantially in its stretched state.

5. A process for producing a synthetic paper, which comprises:

preparing a film to constitute a base layer by forming a sheet having a longitudinal direction of a thermoplastic resin composed essentially of a mixture of a first polypropylene resin and a plasticizer polymer selected from a member of the group consisting of polyethylene resins of densities less than 0.95 gram/ cc., ethylene-propylene copolymers of ethylene contents less than 5 percent by weight, ethylene-vinyl acetate copolymers of vinyl acetate contents less than 40 percent by weight, ethylene-vinyl chloride copolymers, polystyrenes, poly(vinyl halides), and atactic polypropylenes each containing more than 50 percent by weight of a component insoluble in boiling n-heptane in a quantity sufficient to lower the lower limit of the temperature range wherein stretching of the polypropylene resin is practically possible and stretching said sheet uniaxially in said longitudinal direction;

laminating onto at least one surface of the film thus prepared a second polypropylene resin containing from 0.2 to 30 percent by volume of a fine filler blended therewith thereby to form a composite structure wherein said second polypropylene resin is to constitute a paper-like layer;

heat stretching said composite structure in a transverse direction perpendicular to said longitudinal direction; and cooling the structure while it is maintained substantially in its stretched state.

References Cited
UNITED STATES PATENTS

| | | | |
|---|---|---|---|
| 3,380,868 | 4/1968 | Moser | 156—229 |
| 3,394,045 | 7/1968 | Gould | 156—229 X |
| 3,454,455 | 7/1969 | Rasmussen | 161—402 X |

EDWARD G. WHITBY, Primary Examiner

U.S. Cl. X.R.

156—163; 161—252, 402